US012701476B2

(12) United States Patent
Mirza

(10) Patent No.: US 12,701,476 B2
(45) Date of Patent: Aug. 4, 2026

(54) USE OF FDD SCELL TO MITIGATE INTERFERENCE TO UPLINK TDD PCELL

(71) Applicant: T-Mobile USA, Inc., Bellevue, WA (US)

(72) Inventor: Mochamad Mirza, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 358 days.

(21) Appl. No.: 18/441,884

(22) Filed: Feb. 14, 2024

(65) Prior Publication Data

US 2025/0261062 A1     Aug. 14, 2025

(51) Int. Cl.
*H04W 36/06* (2009.01)
*H04L 5/14* (2006.01)
*H04W 16/14* (2009.01)

(52) U.S. Cl.
CPC ........... *H04W 36/06* (2013.01); *H04L 5/1469* (2013.01); *H04W 16/14* (2013.01)

(58) Field of Classification Search
CPC ...... H04W 36/06; H04W 16/14; H04L 5/1469
See application file for complete search history.

(56) References Cited

U.S. PATENT DOCUMENTS

| | | | |
|---|---|---|---|
| 2014/0086078 A1* | 3/2014 | Malladi ................. | H04L 5/1469 370/252 |
| 2015/0098367 A1* | 4/2015 | Park ...................... | H04L 5/0055 370/278 |
| 2016/0112178 A1* | 4/2016 | Yi .......................... | H04W 72/23 370/280 |

* cited by examiner

*Primary Examiner* — Tejis Daya
(74) *Attorney, Agent, or Firm* — Lee & Hayes, P.C.

(57) ABSTRACT

Described herein is a gNodeB (gNB) which determines that interference to an uplink time division duplexing (TDD) carrier between a user equipment (UE) and a PCell of the gNB exceeds a threshold. In response to the determining, the gNB further instructs the UE to move uplink TDD traffic from the uplink TDD carrier to an uplink FDD carrier with an SCell of the gNB. The UE is connected to both the PCell and SCell using carrier aggregation. Additionally, the moving is performed without switching the PCell to an FDD carrier.

20 Claims, 3 Drawing Sheets

USE OF FDD SCELL TO MITIGATE INTERFERENCE TO UPLINK TDD PCELL

BACKGROUND

With advances in Fifth Generation (5G) networks, many gNodeBs (gNBs) use dual carrier, carrier aggregation to communicate with user equipment (UEs). Often, these dual carriers will include a carrier using time division duplexing (TDD) and a carrier using frequency division duplexing (FDD). In one configuration, a gNB may use TDD for a primary cell (PCell) and FDD for a secondary cell (SCell). Because of TDD characteristics, it may be desirable for a mobile network operator (MNO) to use TDD for its gNB's PCell. The uplink TDD carrier of such a PCell, however, may be subject to interference that does not affect the downlink TDD carrier, uplink FDD carrier, or downlink FDD carrier. While the interference can be mitigated by making the FDD the PCell and the TDD the SCell, or handing over to the FDD carriers, such solutions may lose some of the benefits an MNO an its subscribers may receive from utilizing a TDD PCell.

BRIEF DESCRIPTION OF THE DRAWINGS

The detailed description is set forth with reference to the accompanying figures. In the figures, the left-most digit(s) of a reference number identifies the figure in which the reference number first appears. The same reference numbers in different figures indicate similar or identical items.

DETAILED DESCRIPTION

This disclosure is directed in part to moving uplink TDD traffic from its TDD carrier over a PCell to a FDD carrier over an SCell without changing the PCell from TDD to FDD. Uplink TDD traffic can be impacted by interference that does not affect downlink TDD traffic or FDD traffic. Tropospheric ducting, for example, impacts uplink TDD traffic. Existing solutions to this issue include reselecting FDD for the PCell. Doing this, however, forgoes benefits that come from having TDD for the PCell. This problem can be addressed without forgoing use of TDD for the PCell by having the gNB determine interference exceeds a threshold and instruct the UE to send uplink TDD traffic over the uplink FDD carrier instead of the uplink TDD carrier. The uplink TDD carrier can still be maintained, however, and downlink TDD traffic can still be sent over the downlink TDD carrier. Once the interference resolves or reduces, the gNB can instruct the UE to move the uplink TDD traffic back to the uplink TDD carrier.

As used herein, "traffic" can include either or both of control plane and user/data plane traffic. Terms such as "signaling", "control", "data traffic", etc. are all to be understood as types of or synonyms for "traffic".

Figure 1:
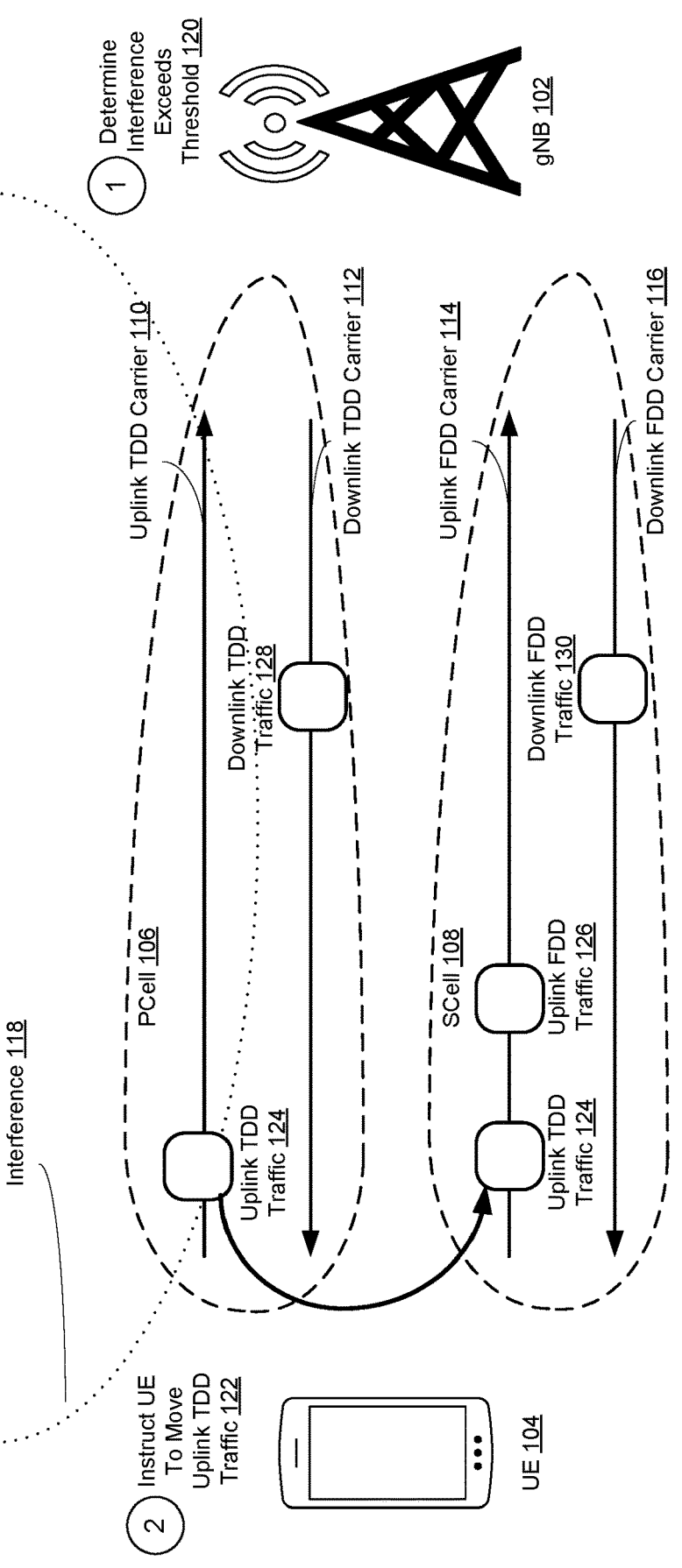
FIG. 1 is an overview diagram of a gNB with a TDD PCell and FDD SCell providing coverage to a UE and experiencing interference to its uplink TDD carrier.

FIG. 1 is an overview diagram of a gNB with a TDD PCell and FDD SCell providing coverage to a UE and experiencing interference to its uplink TDD carrier. As illustrated, a gNB 102 provides connectivity to a UE 104 though carrier aggregation over a PCell 106 and an SCell 108 of the gNB 102. The PCell 106 may utilize TDD and have an uplink TDD carrier 110 and downlink TDD carrier 112 used by the UE 104 and gNB 102 to communicate. The SCell 108 may utilize FDD and have an uplink FDD carrier 114 and downlink FDD carrier 116 used by the UE 104 and gNB 102 to communicate. The uplink TDD carrier 110 may experience interference 118, and the gNB 102 may be configured to determine, at 120, that the interference 118 exceeds a threshold. The gNB 102 may also be configured, at 122, to instruct the UE 104 to move uplink TDD traffic 124 from the uplink TDD carrier 110 to the uplink FDD carrier 114. The uplink TDD carrier 110 may be maintained following the move, and the uplink TDD traffic 124 may be moved back once the interference 118 lessens. As shown in FIG. 1, the uplink FDD carrier 114 may transmit both uplink TDD traffic 124 and uplink FDD traffic 126. Also, downlink TDD carrier 112 may transmit downlink TDD traffic 128 and downlink FDD carrier 116 may transmit downlink FDD traffic 130.

Figure 3:
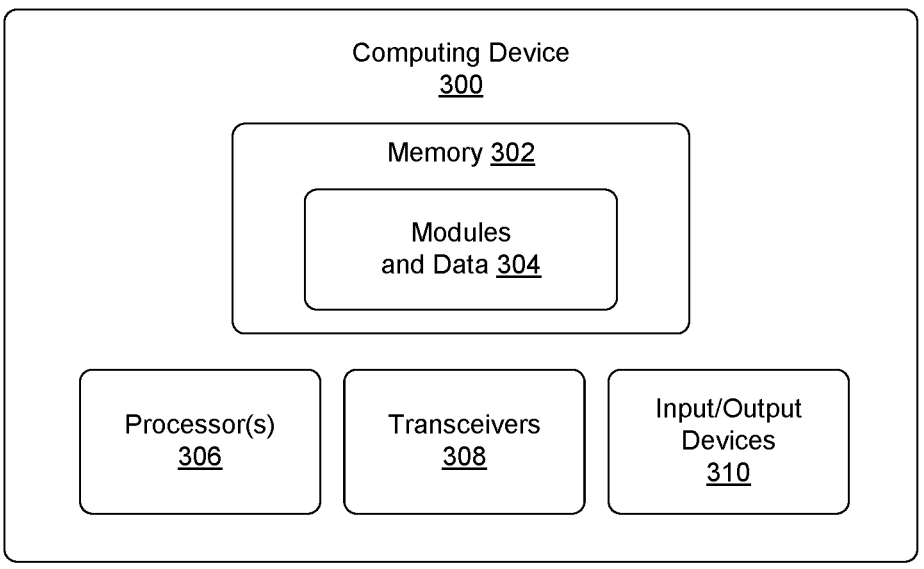
FIG. 3 is a schematic diagram of a computing device capable of implementing functionality of at least one of the device(s) of the telecommunications network.

In various implementations, the gNB 102 may be any sort of base station or base stations supporting carrier aggregation. As a gNB, the gNB 102 may use New Radio (NR)/5G radio access technology and may be a standalone (SA) gNB. In other implementations, the gNB 102 may be non-standalone (NSA) or may even be a base station type other than a gNB (despite the "gNB 102" label applied here), such as an eNodeB or a base station of an earlier or later generation of radio access technology. The gNB 102 may have a scheduler to allocate spectrum from frequency band(s) of the gNB 102 to devices, such as UE 104, to receive performance measures for connections, and to use those measures in allocating spectrum and instructing/configuring devices (e.g., the UE 104) communicating with the gNB 102. An example computing device capable of implementing gNB 102 is illustrated in FIG. 3 and described below in detail with reference to that figure.

The gNB 102 may be associated with multiple frequency bands and may use multiple techniques for frequency division, such as TDD and FDD. In some examples, different cells of the gNB 102 may use different ones of TDD and FDD and may also use different frequency bands. One cell, for instance, may use a first band and TDD and a second cell may use a second band and FDD. In a further example, the cell using TDD may be closer to the gNB 102 and the cell using FDD may be further from the gNB 102. Alternatively, the cells may have the same or overlapping geographic areas. The gNB 102 may send and receive traffic to a single device, such as UE 104, over multiple cells (and multiple carriers) at a same time (or have carriers for doing so at the same time) as the gNB 102 and the device (e.g., UE 104) may both be engaging in carrier aggregation. With carrier aggregation, one of the cells may be designated as the PCell, and one or more other cells may be designated as SCell(s), and each cell may have an uplink carrier and a downlink carrier. In FIG. 1, the gNB 102 has two cells: a PCell 106 and SCell 108. The PCell 106 uses TDD and has an uplink TDD carrier 110 and a downlink TDD carrier 112. The SCell 108 uses FDD and has an uplink FDD carrier 114 and a downlink FDD carrier 116.

In various implementations, the UE 104 may be any sort of device capable of wireless communication with a telecommunications network. The UE 104 may be a cellular phone, a mobile device, a tablet computer, a personal computer (PC), a smart watch, goggles, an Internet-of-Things (IoT) device, a home Internet device, an appliance, etc. As shown in FIG. 1, the UE 104 may be configured for and engage in communication using carrier aggregation, with the UE 104 sending traffic (e.g., uplink TDD traffic 124 and uplink FDD traffic 126) over different carriers of different cells of the gNB 102 and receiving traffic (e.g., downlink TDD traffic 128 and downlink FDD traffic 130) over different carriers of different cells of the gNB 102. The UE 104 may be configured to capture measurements of its network connections and to send these to the gNB 102 as measurement reports. The UE 104 may also be configured to receive instructions/configuration from the gNB 102 identifying which parts of frequency bands or which carriers to use for traffic, as well as whether to use TDD or FDD. An example computing device capable of implementing UE 104 is illustrated in FIG. 3 and described below in detail with reference to that figure.

In some implementations, the uplink TDD carrier 110 of the PCell 106 may experience interference 118. While many things can cause interference, tropospheric ducting is known to specifically impact the frequency bands used for uplink TDD carriers, such as uplink TDD carrier 110. The interference 118 can be detected, at 120, by the gNB 102 by determining a signal to interference and noise ratio (SINR) based on the received uplink TDD traffic 124 or other traffic transmitted using the uplink TDD carrier 110. Alternatively, other measures may be used. If the measure of interference 118 (e.g., the SINR) exceeds a threshold, the scheduler of the gNB 102 may, at 122, instruct the UE 104 to move the uplink TDD traffic 124 to the uplink FDD carrier 114. In some implementations, in addition to or as an alternative to comparing a measure to a threshold, the gNB 102 may utilize a predictive model or receive the outcome of a predictive model (executed on the gNB 102 or on a different system) that predicts future interference 118 based, e.g., on climate information that is predictive of tropospheric ducting.

At 122, as mentioned, the gNB 102 addresses interference 118 that exceeds a threshold by instructing the UE 104 to move the uplink TDD traffic 124 that the UE 104 is transmitting to the uplink FDD carrier 114. The UE 104 and gNB 102 will maintain the uplink TDD carrier 110 while the uplink TDD traffic 124 is sent over the uplink FDD carrier 114, but by sending the uplink TDD traffic 124 over the uplink FDD carrier 114, the negative impact of the interference 118 is avoided. Also, while the uplink TDD traffic 124 is sent over the uplink FDD carrier 114, the uplink FDD traffic 126 may also be sent over the uplink FDD carrier 114. At the same time, no switch is made to the PCell 106, and downlink TDD traffic 128 is still transmitted over the downlink TDD carrier 112. Such an instruction to move the uplink TDD traffic 124 may be received by the UE 104 in one or more control place messages from the gNB 102, which may in turn be determined by the scheduler of the gNB 102.

In various implementations, the gNB 102 may also determine a congestion level or other performance measure for the uplink FDD carrier 114. If the congestion or other metric exceeds a threshold, the gNB 102 may refrain from instructing the UE 104 to move the uplink TDD traffic 124 or may cause the gNB 102 to utilize another SCell (not shown) for transmission of the uplink TDD traffic.

In further implementations, the monitoring of interference 118 by the gNB 102 may continue on an event driven or periodic basis even after the UE 104 has moved the uplink TDD traffic 124 to the uplink FDD carrier 114. If the interference 118 detected on the uplink TDD carrier 110 falls below the threshold (e.g., by a certain amount or for a certain duration), the scheduler of the gNB 102 may instruct the UE 104 to move the uplink TDD traffic 124 back to the uplink TDD carrier 110. Such monitoring and movement may happen repeatedly over a time without requiring a switch of the PCell 106 to FDD.

Figure 2:
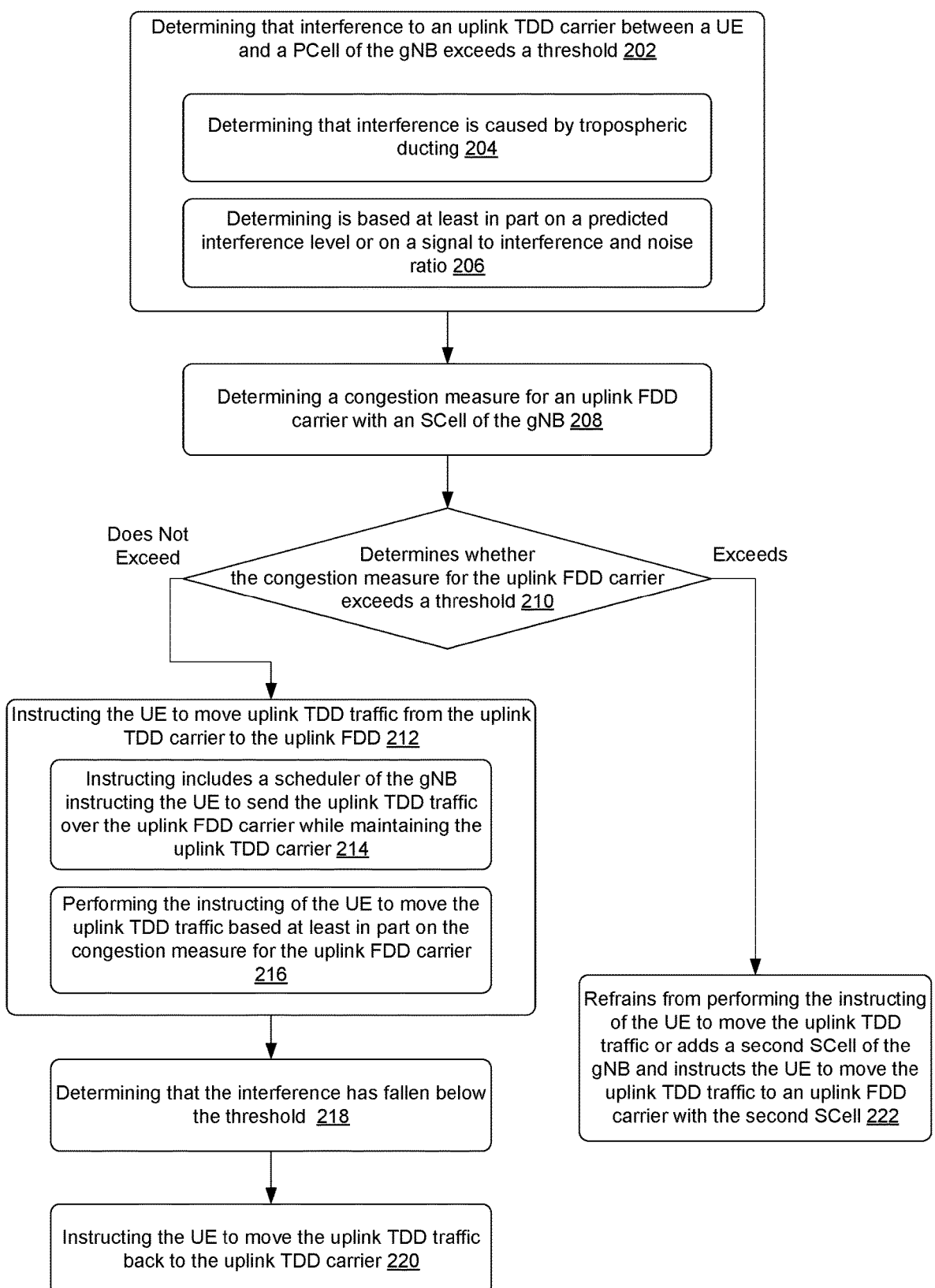
FIG. 2 is a flow diagram of an illustrative process for determining that an uplink TDD carrier of a PCell of a gNB is experiencing interference and instructing a UE to move uplink TDD traffic to be sent over an uplink FDD carrier of a SCell of the gNB.

FIG. 2 illustrates an example process. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 2 is a flow diagram of an illustrative process for determining that an uplink TDD carrier of a PCell of a gNB is experiencing interference and instructing a UE to move uplink TDD traffic to be sent over an uplink FDD carrier of a SCell of the gNB. As illustrated at 202, a gNB determines that interference to an uplink TDD carrier between a UE and a PCell of the gNB exceeds a threshold. At 204, the interference is caused by tropospheric ducting. At 206, the determining is based at least in part on a predicted interference level or on a signal to interference and noise ratio.

At 208, the gNB determines a congestion measure for an uplink FDD carrier with an SCell of the gNB. At 210, the gNB determines whether the congestion measure for the uplink FDD carrier exceeds a threshold.

When the congestion measure for the uplink FDD carrier does not exceed the threshold, the gNB instructs, at 212, the UE to move uplink TDD traffic from the uplink TDD carrier to the uplink FDD. The instructing is in response to determining that interference exceeds a threshold and the moving is performed without switching the PCell to an FDD carrier. At 214, the instructing includes a scheduler of the gNB instructing the UE to send the uplink TDD traffic over the uplink FDD carrier while maintaining the uplink TDD carrier. At 216, the gNB performs the instructing of the UE to move the uplink TDD traffic based at least in part on the congestion measure for the uplink FDD carrier.

At 218, the gNB determines that the interference has fallen below the threshold and, in response, at 220, instructs the UE to move the uplink TDD traffic back to the uplink TDD carrier.

Returning to the decision block at 210, when the congestion measure for the uplink FDD carrier does exceed the threshold, the gNB, at 222, either refrains from performing the instructing of the UE to move the uplink TDD traffic or adds a second SCell of the gNB and instructs the UE to move the uplink TDD traffic to an uplink FDD carrier with the second SCell.

FIG. 3 is a schematic diagram of a computing device 300 capable of implementing functionality of at least one of the device(s) of the telecommunications network, such as the gNB 102 and/or UE 104. As shown, the computing device

300 includes a memory 302 storing modules and data 304, processor(s) 306, transceivers 308, and input/output devices 310.

In various examples, the memory 302 can include system memory, which may be volatile (such as RAM), non-volatile (such as ROM, flash memory, etc.) or some combination of the two. The memory 302 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information.

The memory 302 can include one or more software or firmware elements, such as computer-readable instructions that are executable by the one or more processors 306. For example, the memory 302 can store computer-executable instructions associated with modules and data 304. The modules and data 304 can include a platform, operating system, and applications, and data utilized by the platform, operating system, and applications. Further, the modules and data 304 can implement any of the functionality for the gNB 102, UE 104, or any other node/device described and illustrated herein.

In various examples, the processor(s) 306 can be a central processing unit (CPU), a graphics processing unit (GPU), or both CPU and GPU, or any other type of processing unit. Each of the one or more processor(s) 306 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 406 may also be responsible for executing all computer applications stored in the memory 302, which can be associated with types of volatile (RAM) and/or nonvolatile (ROM) memory.

The transceivers 308 can include modems, interfaces, antennas, Ethernet ports, cable interface components, and/or other components that perform or assist in exchanging wireless communications, wired communications, or both.

While the computing device need not include input/output devices 310, in some implementations it may include one, some, or all of these. For example, the input/output devices 310 can include a display, such as a liquid crystal display or any other type of display. For example, the display may be a touch-sensitive display screen and can thus also act as an input device or keypad, such as for providing a soft-key keyboard, navigation buttons, or any other type of input. The input/output devices 310 can include any sort of output devices known in the art, such as a display, speakers, a vibrating mechanism, and/or a tactile feedback mechanism. Output devices can also include ports for one or more peripheral devices, such as headphones, peripheral speakers, and/or a peripheral display. The input/output devices 310 can include any sort of input devices known in the art. For example, input devices can include a microphone, a keyboard/keypad, and/or a touch-sensitive display, such as the touch-sensitive display screen described above. A keyboard/ keypad can be a push button numeric dialing pad, a multi-key keyboard, or one or more other types of keys or buttons, and can also include a joystick-like controller, designated navigation buttons, or any other type of input mechanism.

Although features and/or methodological acts are described above, it is to be understood that the appended claims are not necessarily limited to those features or acts. Rather, the features and acts described above are disclosed as example forms of implementing the claims.

What is claimed is:

1. A method comprising:
   determining, by a gNodeB (gNB), that interference to an uplink time division duplexing (TDD) carrier between a user equipment (UE) and a PCell of the gNB exceeds a threshold; and
   in response to the determining, instructing, by the gNB, the UE to move uplink TDD traffic from the uplink TDD carrier to an uplink FDD carrier with an SCell of the gNB, with the UE connected to both the PCell and SCell using carrier aggregation,
   wherein the moving is performed without switching the PCell to an FDD carrier.

2. The method of claim 1, further comprising determining that the interference has fallen below the threshold and, in response, instructing the UE to move the uplink TDD traffic back to the uplink TDD carrier.

3. The method of claim 1, wherein the interference is caused by tropospheric ducting.

4. The method of claim 1, wherein the determining is based at least in part on a predicted interference level or on a signal to interference and noise ratio.

5. The method of claim 1, wherein the instructing includes a scheduler of the gNB instructing the UE to send the uplink TDD traffic over the uplink FDD carrier while maintaining the uplink TDD carrier.

6. The method of claim 1, further comprising determining a congestion measure for the uplink FDD carrier and performing the instructing of the UE to move the uplink TDD traffic based at least in part on the congestion measure.

7. The method of claim 6, further comprising, when the congestion measure exceeds a threshold, either refraining from performing the instructing of the UE to move the uplink TDD traffic or adding a second SCell of the gNB and instructing the UE to move the uplink TDD traffic to an uplink FDD carrier with the second SCell.

8. A gNodeB (gNB) comprising:
   one or more processors; and
   a plurality of programming instructions that, when executed by the one or more processors cause the gNB to perform operations including:
      determining that interference to an uplink time division duplexing (TDD) carrier between a user equipment (UE) and a PCell of the gNB exceeds a threshold; and
      in response to the determining, instructing the UE to move uplink TDD traffic from the uplink TDD carrier to an uplink FDD carrier with an SCell of the gNB, with the UE connected to both the PCell and SCell using carrier aggregation,
   wherein the moving is performed without switching the PCell to an FDD carrier.

9. The gNB of claim 8, wherein the operations further comprise determining that the interference has fallen below the threshold and, in response, instructing the UE to move the uplink TDD traffic back to the uplink TDD carrier.

10. The gNB of claim 8, wherein the interference is caused by tropospheric ducting.

11. The gNB of claim 8, wherein the determining is based at least in part on a predicted interference level or on a signal to interference and noise ration.

12. The gNB of claim 8, wherein the instructing includes a scheduler of the gNB instructing the UE to send the uplink TDD traffic over the uplink FDD carrier while maintaining the uplink TDD carrier.

13. The gNB of claim 8, wherein the operations further comprise determining a congestion measure for the uplink FDD carrier and performing the instructing of the UE to move the uplink TDD traffic based at least in part on the congestion measure.

14. The gNB of claim 13, wherein the operations further comprise, when the congestion measure exceeds a threshold, either refraining from performing the instructing of the UE to move the uplink TDD traffic or adding a second SCell of the gNB and instructing the UE to move the uplink TDD traffic to an uplink FDD carrier with the second SCell.

15. A non-transitory computer storage medium having a plurality of programming instructions stored thereon that, when executed by one or more processors of a gNodeB (gNB) cause the gNB to perform operations comprising:

determining that interference to an uplink time division duplexing (TDD) carrier between a user equipment (UE) and a PCell of the gNB exceeds a threshold; and
  in response to the determining, instructing the UE to move uplink TDD traffic from the uplink TDD carrier to an uplink FDD carrier with an SCell of the gNB, with the UE connected to both the PCell and SCell using carrier aggregation,

wherein the moving is performed without switching the PCell to an FDD carrier.

16. The non-transitory computer storage medium of claim 15, wherein the operations further comprise determining that the interference has fallen below the threshold and, in response, instructing the UE to move the uplink TDD traffic back to the uplink TDD carrier.

17. The non-transitory computer storage medium of claim 15, wherein the determining is based at least in part on a predicted interference level or on a signal to interference and noise ration.

18. The non-transitory computer storage medium of claim 15, wherein the instructing includes a scheduler of the gNB instructing the UE to send the uplink TDD traffic over the uplink FDD carrier while maintaining the uplink TDD carrier.

19. The non-transitory computer storage medium of claim 15, wherein the operations further comprise determining a congestion measure for the uplink FDD carrier and performing the instructing of the UE to move the uplink TDD traffic based at least in part on the congestion measure.

20. The non-transitory computer storage medium of claim 19, wherein the operations further comprise, when the congestion measure exceeds a threshold, either refraining from performing the instructing of the UE to move the uplink TDD traffic or adding a second SCell of the gNB and instructing the UE to move the uplink TDD traffic to an uplink FDD carrier with the second SCell.

* * * * *